United States Patent

[11] 3,550,655

| [72] | Inventor | Robert N. Murphy |
| | | Washington, Ga. |
| [21] | Appl. No. | 742,805 |
| [22] | Filed | July 5, 1968 |
| [45] | Patented | Dec. 29, 1970 |
| [73] | Assignee | J. I. Case Company |
| | | Racine, Wis. |
| | | a corporation of Wisconsin. by mesne assignments |

[54] TORQUE-ABSORBING COUPLER
8 Claims, 5 Drawing Figs.

[52] U.S. Cl. .................................................... 144/34,
214/147
[51] Int. Cl. ...................................................... A01g 23/02
[50] Field of Search........................................... 144/2.21,
3.4, 34, 34.(1-6), 309.(34); 214/147, 147G, 3,
145, 620, 652, (Inquired)

[56] References Cited
UNITED STATES PATENTS

| 2,559,816 | 7/1951 | Alexander | 144/34 |
| 3,074,446 | 1/1963 | Earl | 144/3 |
| 3,140,736 | 7/1964 | Propst | 144/34 |
| 3,294,131 | 12/1966 | Larson | 144/34 |

Primary Examiner—Gerald A. Dost
Attorney—Zarley, McKee & Thomte

ABSTRACT: A torque-absorbing coupler adapted to permit the attachment of the tree shear means to a self-propelled vehicle having a pair of boom members pivotally mounted thereon. A mounting means is detachably secured to a cross-member extending between the forward ends of the boom members and has a shaft means extending transversely forwardly therefrom. A sleeve is rotatably mounted on the shaft and has the tree shear means rigidly secured thereto. A locking means is provided which permits the sleeve and the tree shear to be locked in various positions of its rotatable movement with respect to the shaft and the boom members.

PATENTED DEC 29 70
3,550,655
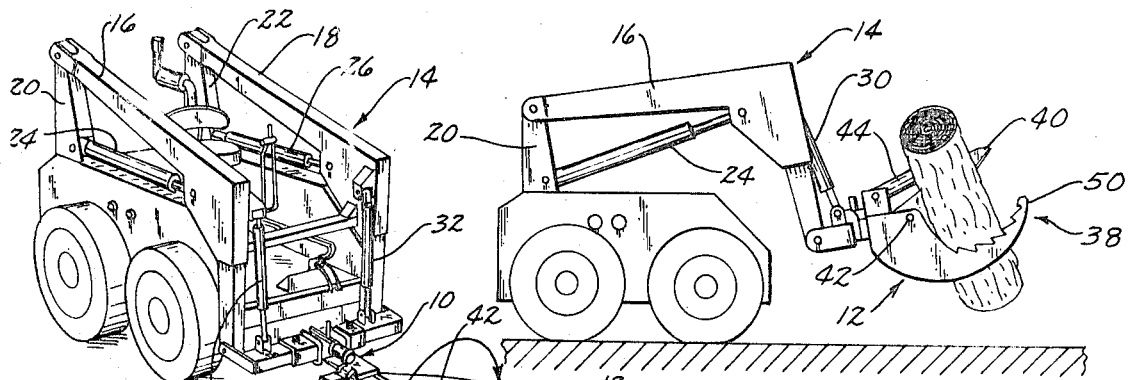
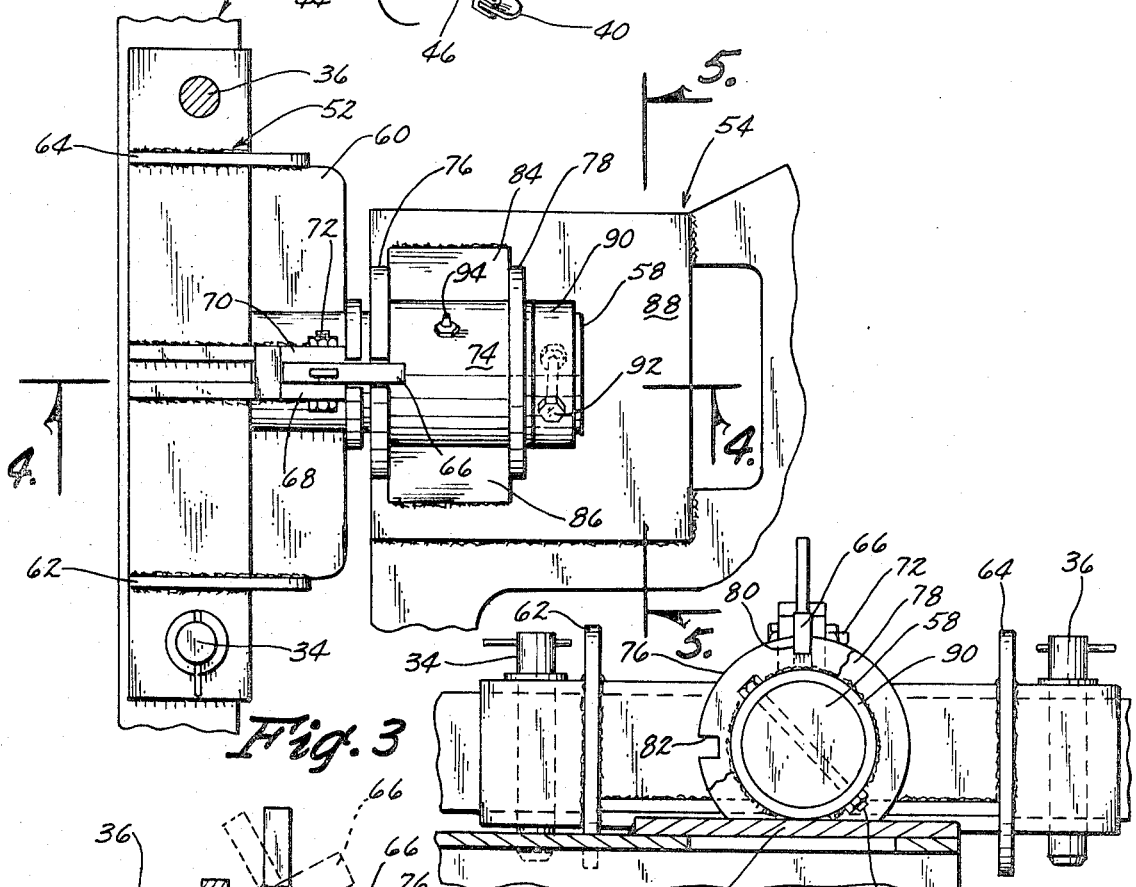
INVENTOR
ROBERT N. MURPHY
BY
Zarley, McKee & Thomte
ATTORNEYS

TORQUE-ABSORBING COUPLER

Tree-shearing devices are used in the lumber industry to shear trees into various lengths. The tree-shearing devices have been sometimes mounted on wheeled frame means which are moved into position by a prime mover of the like. The conventional tree-shearing devices are only adapted to shear those trees which are standing in a substantially vertical condition since the jaw members thereof are pivoted in a substantially horizontal plane. Additionally, the conventional tree-shearing devices impose an objectionable amount of torsional stress into the frame means upon which they are mounted due to the twisting motion created by the conventional tree-shearing devices.

Therefore, it is a principal object of this invention to provide a torque-absorbing coupler for a tree shear means.

A further object of this invention is to provide a torque-absorbing coupler adapted to permit the attachment of a tree shear means to a self-propelled vehicle.

A further object of this invention is to provide a torque-absorbing coupler which is quickly and easily attached to the vehicle.

A further object of this invention is to provide a torque-absorbing coupler for a tree shear means which permits the jaw members to be rotated and locked into various positions.

A further object of this invention is to provide a torque-absorbing coupler which prevents damage to the supporting means due to the absorption of the torque.

A further object of this invention is to provide a torque-absorbing coupler which is extremely versatile.

A further object of this invention is to provide a torque-absorbing coupler which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of a self-propelled vehicle having a tree shear means secured thereto by means of the coupler of this invention;

FIG. 2 is a side view of the equipment of FIG. 1;

FIG. 3 is a top view of the coupler of this invention;

FIG. 4 is a sectional view as seen along lines 4-4 of FIG. 3; and

FIG. 5 is a sectional view as seen along lines 5-5 of FIG. 3 with portions thereof cut away to more fully illustrate the invention.

The torque-absorbing coupler of this invention is generally designated by the reference numeral 10 while the tree shear means is generally designated by the reference numeral 12. The reference numeral 14 generally refers to a self-propelled vehicle such as manufactured by Universal Manufacturing Company of Hudson, Iowa which is discussed in detail in U.S. Pat. Nos. 3,319,817 and 3,340,942. The vehicle 14 is of the four-wheel drive type and includes a pair of boom members 16 and 18 which are pivotally connected at their rearward ends to upstanding posts 20 and 22 respectively. The boom members 16 and 18 are raised and lowered by means of the hydraulic cylinders 24 and 26 secured thereto. A crossmember means 28 is pivotally connected to and extends between the forward ends of boom members 16 and 18 and is pivoted with respect thereto by hydraulic cylinders 30 and 32. Crossmember means 28 is channel-shaped in cross section (FIG. 4) and has a pair of openings extending downwardly therethrough adapted to receive pins 34 and 36 respectively.

The tree shear means 12 includes a stationary jaw member 38 having a movable blade member 40 pivoted thereto at 42. Blade 40 is pivoted with respect to jaw member 38 by a hydraulic cylinder 44. Thus, the extension of the rod 46 from the hydraulic cylinder 44 will cause the blade 40 to move towards and between the plates 48 and 50 of jaw member 38 to shear the tree which would be positioned between the blade 40 and the jaw member 38.

Coupler 10 includes a vehicle mount portion 52 which is detachably secured to the crossmember means 28 and also includes a stationary mount portion 54 which is secured to the rearward end of the tree shear means 12 by any suitable means such as welding or the like. Vehicle mount portion 52 includes a channel-shaped member 56 which embraces crossmember means 28 as best illustrated in FIG. 4. Channel-shaped member 56 is maintained on crossmember means 28 by means of the pins 34 and 36 extending through channel-shaped member 56 and crossmember means 28 (FIG. 4). A shaft 58 is welded to the forward end of member 56 and extends transversely forwardly therefrom. Reinforcing plate 60 is positioned below shaft 58 and extends laterally therefrom as illustrated in FIGS. 3 and 4. A pair of spaced apart reinforcing plates 62 and 64 are secured to opposite ends of the plate 60 and are also secured to the upper portion of channel-shaped member 56 by welding or the like as illustrated in the drawings. A latch 66 is positioned between ears 68 and 70 and is pivotally secured thereto by means of a bolt 72. Ears 68 and 70 are secured to the top portion of channel-shaped member 56 and shaft 58 as best illustrated in FIGS. 3 and 4. Sleeve 74 rotatably embraces shaft 58 and has spaced apart radial flanges 76 and 78 secured thereto adjacent the rearward and forward ends thereof as illustrated in FIGS. 3 and 4. Flange 76 is at least provided with notches 80 and 82 provided therein which are disposed in a 90 degree relationship thereon and which are adapted to receive latch 66 therein at times to limit the rotation of the sleeve 74 with respect to the shaft 58. Reinforcing plates 84 and 86 are welded to opposite sides of the sleeve 74 and extend downwardly and outwardly therefrom to plate 88. Collar 90 embraces the outer end of shaft 58 outwardly of sleeve 74 and is maintained therein by a bolt 92 extending through collar 90 and shaft 58 as best illustrated in FIG. 5. A grease fitting 94 is provided in the sleeve 74 to permit the insertion of grease between sleeve 74 and shaft 58. A flange 96 is provided on shaft 58 rearwardly of sleeve 74 to limit the rearward movement of sleeve 74 with respect to the shaft 58.

In operation, the vehicle mount portion 52 may be separated from the stationary mount portion 54 to facilitate the easy attachment of the mount portion 52 to the crossmember means 28. The pins 34 and 36 are inserted through the channel-shaped member 56 and the crossmember means 28 to achieve a rigid connection therebetween. The vehicle may then be maneuvered to cause the shaft 58 to be received in the sleeve 74. The collar 90 would then be secured to the exposed end of shaft 58 to maintain the stationary mount portion 74 and the tree shear means 12 on the vehicle mount portion 52. It should also be noted that the entire assembly, namely, tree shear means 12, stationary mount portion 54 and vehicle mount portion 52 could be left in an assembled condition and secured to the crossmember means 28 by the insertion of the pins 34 and 36 therethrough.

When latch 66 is in its raised position as illustrated by broken lines in FIG. 4, the sleeve 74 and hence the tree shear means 12 are free to rotate about the shaft 58. The raised condition of the latch 66 permits the tree shear means 12 to be oriented to receive a tree or trunk regardless of the orientation thereof. FIG. 1 illustrates the tree shear means in a horizontal position so that a vertical tree could be positioned between the jaw member 38 and the blade 40 while FIG. 2 illustrates the tree shear means 12 oriented in a vertical plane to accommodate a horizontal log or trunk therebetween. It can be appreciated that the raised condition of latch 66 permits the tree shear means 12 to be rotated to any relative rotational position. When latch 66 is received by notch 80 in flange 76, the tree shear means 12 will be oriented in a horizontal plane. When latch 66 is received by notch 82 in flange 76, the tree shear means 12 will be oriented and locked in a vertical plane.

When latch 66 is in either of the notches 80 or 82 and the blade 40 is actuated to cause the shearing of a tree, the rotation of the shear is controlled so that all stress is absorbed through the control twist of the stationary mount portion 54 thereby preventing damage to the associated equipment. The torsional stress which is created by the blade 40 passing through a tree positioned between it and jaw member 38 is absorbed by the stationary mount portion 54. The torque is absorbed in the sleeve 74 which is well lubricated thus transferring all stress into the rotational portion of the coupler.

The coupler illustrated in this invention may be used with any suitable equipment but it is especially well adapted for use with the self-propelled vehicle illustrated in the drawings and identified herebefore. The attachment of the tree shear means to self-propelled vehicle by means of the coupler 10 creates an extremely versatile piece of equipment which prevents damage to any of the associated parts. It can be appreciated that the tree shear means 12 is quickly and easily attached to the vehicle by means of the bolts 34 and 36 as previously described. Thus it can be seen that the coupler achieves all of its stated objectives.

I claim:

1. In combination:

a self-propelled vehicle, said vehicle having a lifting boom means pivotally secured thereto at the rearward end thereof and extending forwardly therefrom;

a coupling means detachably secured to the forward end of said boom means;

a tree shear means operatively rotatably secured to said coupling means whereby said shear means may be rotated with respect to said vehicle to orient the same with respect to the tree to be sheared; and said coupling means includes a vehicle mount portion detachably secured to the forward ends of said boom means, said vehicle mounting portion having a shaft secured thereto and extending forwardly therefrom, said coupling means also including a sleeve operatively secured to said tree shear means adapted to rotatably embrace said shaft.

2. The combination of claim 1 wherein said coupling means includes a locking means adapted to selectively prevent the rotation of said sleeve and tree shear means with respect to said vehicle at times.

3. The combination of claim 2 wherein said sleeve has a radial flange extending therefrom having at least first and second notches formed therein adapted to receive a latch therein, said latch being pivotally secured to said vehicle mount portion, said notches being disposed at a 90 degree relationship with respect to each other.

4. The combination of claim 2 wherein said tree shear means includes a blade means movable towards a jaw member, said sleeve means absorbing torsional stress when said blade means is moved through a tree.

5. The combination of claim 1 wherein a collar detachably embraces said shaft to maintain said sleeve on said shaft.

6. The combination of claim 1 wherein a crossmember is pivotally secured to and extends between the forward ends of the boom members comprising said boom means, said vehicle mount portion including a channel member adapted to embrace said crossmember.

7. In a coupling means for detachably securing a tree shear means to a self-propelled vehicle having a pair of boom members pivotally mounted thereon, said boom members having a crossmember pivotally secured to and extending between the forward ends thereof;

a shaft adapted to be operatively detachably secured to said crossmember;

said shaft extending transversely forwardly with respect to said crossmember;

a sleeve means rotatably mounted on said shaft; and said sleeve means having said tree shear means secured thereto whereby said tree shear means may be rotated with respect to said shaft.

8. The means of claim 7 wherein a locking means is adapted to operatively engage said sleeve means to maintain said sleeve means and tree shear means in various positions of their rotational movement with respect to said vehicle.